(12) United States Patent
Bauchot et al.

(10) Patent No.: US 11,537,831 B2
(45) Date of Patent: Dec. 27, 2022

(54) GENERATING MEASUREMENT DATA USING IMAGE DATA

(71) Applicant: International Business Machines Corporation, Armonk, NY (US)

(72) Inventors: Frederic Bauchot, la Tourraque (FR); Zsolt Szalai, Tourrettes-sur-Loup (FR); Joel Viale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/024,063

(22) Filed: Sep. 17, 2020

(65) Prior Publication Data

US 2022/0083831 A1    Mar. 17, 2022

(51) Int. Cl.
*G06K 19/06*   (2006.01)
*G06K 7/14*    (2006.01)
*G06T 11/60*   (2006.01)

(52) U.S. Cl.
CPC ..... *G06K 19/06037* (2013.01); *G06K 7/1439* (2013.01); *G06K 19/06046* (2013.01); *G06T 11/60* (2013.01)

(58) Field of Classification Search
CPC ....... G06K 19/06037; G06K 19/06046; G06K 7/1439; G06K 7/1404; G06K 7/00
USPC .......................... 382/321, 312; 235/449–450
See application file for complete search history.

(56) References Cited

U.S. PATENT DOCUMENTS

| 8,251,279 | B2 | 8/2012 | Lyon |
| 8,916,258 | B2 | 12/2014 | Bauchot |
| 10,936,837 | B1* | 3/2021 | Deacon ............ G06K 19/06037 |
| 2004/0076310 | A1* | 4/2004 | Hersch ................. G07D 7/0032 |
| | | | 382/100 |

(Continued)

FOREIGN PATENT DOCUMENTS

| DE | 60310977 T2 * | 10/2007 | .......... B42D 25/342 |
| EP | 3245924 A1 | 11/2017 | |

(Continued)

OTHER PUBLICATIONS

International Search Report and Written Opinion, International Application No. PCT/EP2021/075374, dated Feb. 28, 2022, 14 pages.

(Continued)

*Primary Examiner* — Edwyn Labaze
(74) *Attorney, Agent, or Firm* — Michael A. Petrocelli

(57) ABSTRACT

Aspects of the present invention disclose a method, computer program product, and system for determining information based on a received image. The method includes one or more processors receiving image data from a computing device. The method further includes one or more processors identifying an object included in the received image data. The method further includes one or more processors determining a value that corresponds to the identified object included in the received image data. The method further includes one or more processors determining whether the determined value corresponds to a defined action. Another aspect of the present invention discloses an apparatus that includes a foreground label overlaying a background label, and a measurement device coupled to the foreground label. The measurement device is capable of movement in response to observing measurement data.

20 Claims, 10 Drawing Sheets

(56) References Cited

U.S. PATENT DOCUMENTS

2019/0362116 A1    11/2019  Prusik
2021/0004589 A1*    1/2021  Turkelson ................. G06T 5/00

FOREIGN PATENT DOCUMENTS

| JP | 2019008564 A | 1/2019 | | |
|---|---|---|---|---|
| KR | 101672985 B1 | 11/2016 | | |
| WO | WO-2017030220 A1 | * | 2/2017 | ............ G04G 21/00 |
| WO | 2022058377 A2 | 3/2022 | | |

OTHER PUBLICATIONS

Liu, et al., "Recognition of QR Code with Mobile Phones", 2008 Chinese Control and Decision Conference, Jul. 2-4, 2008, pp. 203-206, <https://ieeexplore.ieee.org/document/4597299>.

Tiwari, Sumit, "An Introduction to QR Code Technology", 2016 International Conference on Information Technology, Dec. 2016, pp. 39-44, <https://www.researchgate.net/publication/318125149_An_Introduction_to_QR_Code_Technology>.

* cited by examiner

FIG. 5A
FIG. 5B

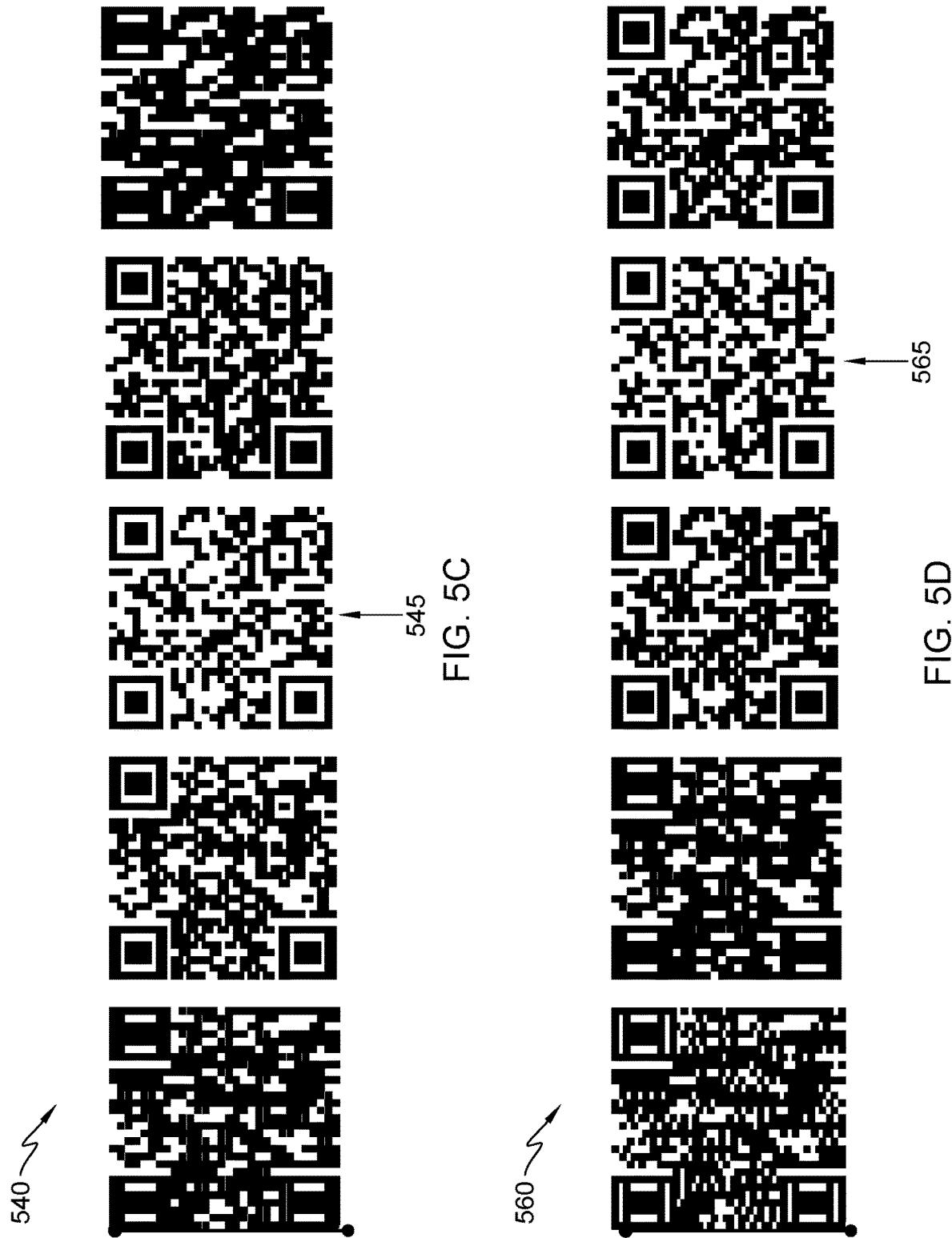

GENERATING MEASUREMENT DATA USING IMAGE DATA

BACKGROUND OF THE INVENTION

The present invention relates generally to the field of data gathering, and more particularly to generating measurement data based on analyzing image data.

A barcode (or bar code) is a method of representing data in a visual, machine-readable form. Initially, barcodes represented data by varying the widths and spacings of parallel lines. These barcodes, now commonly referred to as linear or one-dimensional (1D), can be scanned by special optical scanners, called barcode readers. Later, two-dimensional (2D) variants were developed, using rectangles, dots, hexagons and other geometric patterns, called matrix codes or 2D barcodes, although they do not use bars as such. 2D barcodes can be read or deconstructed using application software on mobile devices with inbuilt cameras, such as smartphones.

A QR (Quick Response) code is a type of matrix barcode (or two-dimensional barcode). A barcode is a machine-readable optical label that can contain information about the item to which the QR code is attached. In practice, QR codes often contain data for a locator, identifier, or tracker that points to a website or application. A QR code uses four standardized encoding modes (numeric, alphanumeric, byte/binary, and kanji) to store data efficiently; extensions may also be used.

A QR code consists of black squares arranged in a square grid on a white background, which can be read by an imaging device such as a camera. The QR code can be processed using Reed-Solomon error correction until the image can be appropriately interpreted. The required data is then extracted from patterns that are present in both horizontal and vertical components of the image.

SUMMARY

Aspects of the present invention disclose a method, computer program product, and system for determining information based on a received image. The method includes one or more processors receiving image data from a computing device. The method further includes one or more processors identifying an object included in the received image data. The method further includes one or more processors determining a value that corresponds to the identified object included in the received image data. The method further includes one or more processors determining whether the determined value corresponds to a defined action.

Another aspect of the present invention discloses a measurement apparatus. The measurement apparatus comprises a background label. The background label depicts a first set of objects, where the background label is anchored to a fixed position. The apparatus further includes a foreground label overlaying the background label. The foreground label depicts a second set of objects, where the second set of objects matches the first set of objects. In addition, the spacing between respective objects of the second set of objects is shifted relative to spacing between respective objects of the first set of objects, corresponding to defined measurement values associated with the foreground label and the background label. The apparatus further includes a measurement device coupled to the foreground label. The measurement device is capable of movement in a first direction corresponding to observing measurement data.

BRIEF DESCRIPTION OF THE DRAWINGS

FIG. 5A depicts a visual representation of an example meter, when at a temperature that corresponds to measurement using QR code overlay of a foreground mask on a background pattern arranged orthogonal to the translation, in accordance with various embodiments of the present invention.

FIG. 5B depicts a visual representation of an example meter, when at a temperature that corresponds to measurement using QR code overlay of a foreground mask on a background pattern arranged orthogonal to the translation, in accordance with various embodiments of the present invention.

FIG. 5C depicts a visual representation of an example meter, when at a temperature that corresponds to measurement using QR code overlay of a foreground mask on a background pattern arranged orthogonal to the translation, in accordance with various embodiments of the present invention.

FIG. 5D depicts a visual representation of an example meter, when at a temperature that corresponds to measurement using QR code overlay of a foreground mask on a background pattern arranged orthogonal to the translation, in accordance with various embodiments of the present invention.

DETAILED DESCRIPTION

Figure 1:
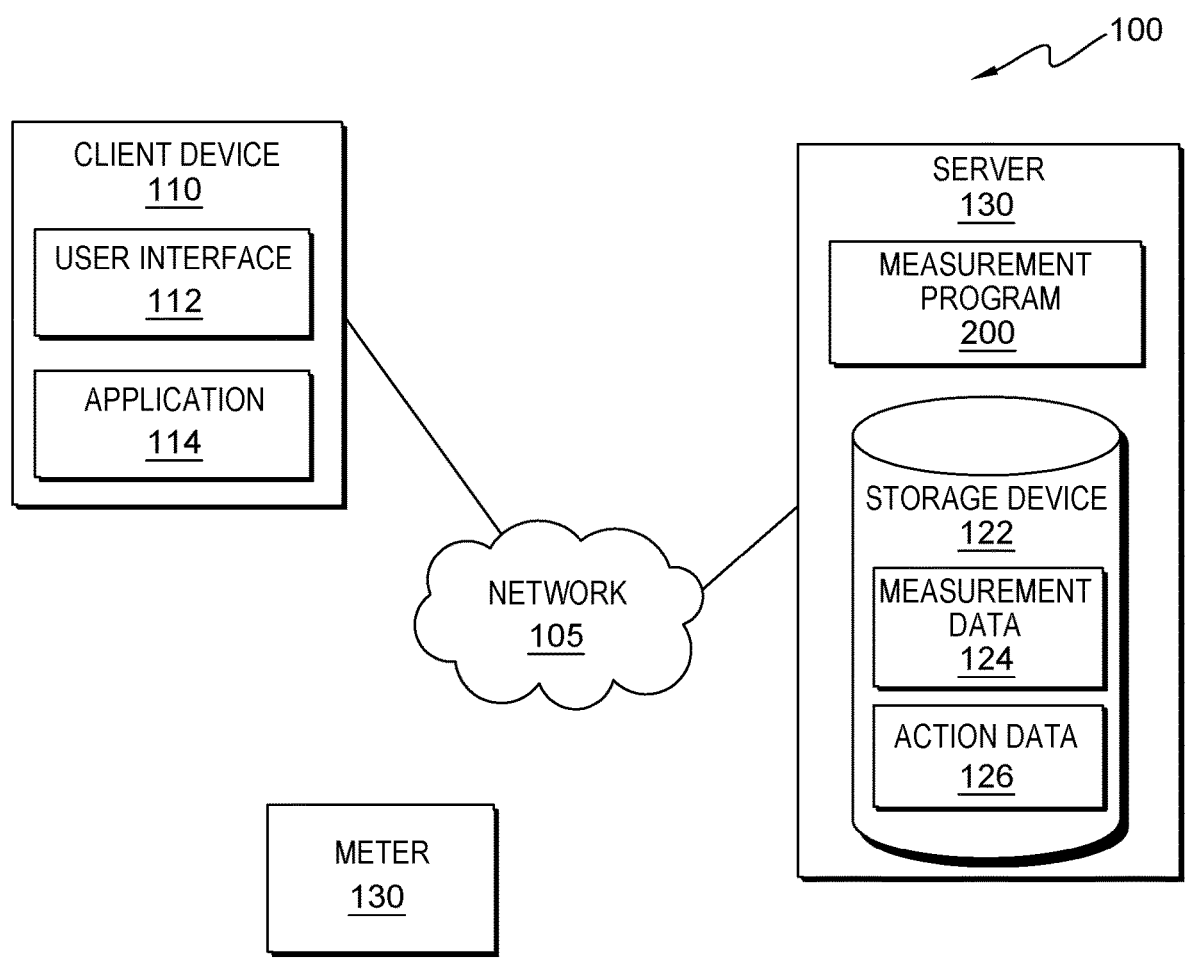
FIG. 1 is a functional block diagram of a data processing environment, in accordance with an embodiment of the present invention.

Embodiments of the present invention allow for a method and system to generate measurement data utilizing environment-dependent labels on measurement points. For example, embodiments of the present invention receive image data and determine a measurement value corresponding to the image data. In example aspects, the image data can be and/or include a QR (Quick Response) code. Further embodiments of the present invention can determine whether an action corresponds to the determined measurement value. Then, in response to determining that the determined measurement value does correspond to an action, embodiments of the present invention can perform and/or facilitate execution of the identified action.

Some embodiments of the present invention recognize the need for an improvement to passive measurement systems, particular for outdoor environments. For several outdoor business activities (e.g. hydrology, construction and public works, infrastructure maintenance, agronomy, etc.) and for several outdoor leisure activities (e.g. trekking, alpinism, paragliding, country skiing, etc.), embodiments of the present invention recognize the importance to precisely know some environmental parameters to properly manage business needs or for safety purpose. Typical parameters (e.g., environmental parameters) are directly or indirectly related to weather, for instance the temperature, wind speed/direction, the level of a water tank (artificial or natural), the river flow, the vegetation growth, etc.

In addition, embodiments of the present invention recognize that individuals can benefit from a dedicated apparatus aimed at providing such information, such as fixed or mobile thermometer, flowmeter, ruler, etc. Embodiments of the present invention also recognize that such equipment often needs to be powered, may need to be interconnected with an infrastructure backbone, may be expensive and offer a wide range of user interfaces and require a diversified set of readers. Accordingly, when environmental information is needed in areas with limited (if not zero) communication and power infrastructure, embodiments of the present invention recognize a need for energy friendly, cheap, passive, easy-to-read meters measuring environmental parameters.

In an example aspect, embodiments of the present invention include a label comprising different QR codes. The label comprises a fixed background pattern with printed QR codes, which is overlaid by a foreground transparent sliding mask with the same shifted printed QR codes. The relative position of the sliding mask on the fixed pattern is governed by the lengthwise variation associated to the measured data. For example, the dilatation of a rod hooked on the sliding mask can modify the relative position of the sliding mask on the fixed pattern. The positioning of the QR codes both on the fixed pattern and on the sliding mask is such that the pattern/mask superposition exhibits a single valid QR code for a given translation associated to a given value of the measured data. By encoding the corresponding value, completed by the fixed data, the valid QR code delivers a self-contained record comprising accurate live information. In example embodiments, the label can operate as a passive outdoor environmental monitor. In alternate aspects (depicted in the Figures and described in further detail later), the QR codes can be arranged in a row either parallel or orthogonal to the translation direction. In other embodiments, a meter can include QR codes in any possible different arrangement, such as on a rotational axis, etc.

Another example aspect of the present invention is an application (e.g., an application on a mobile device, in communication with a server computer system), which can first read the valid QR code, acquire the fixed and variable data. Further, reading the data can operate to initiate one or more business processes, such through integration with an enterprise resource planning (ERP), enterprise asset management (EAM), building information modeling (BIM), etc., application(s). Alternatively, a conventional QR reader available on a mobile device can read the valid QR code and display to the user the recorded data.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110 and server 120, all interconnected over network 105. In addition, data processing environment 100 includes meter 130, which is not connected to network 105. However, in an alternate embodiment, meter 130 can communicate with computing device 110, and optionally connect to network 105, in accordance with various embodiments of the present invention. In an example embodiment, server 120 is representative of a computing device (e.g., one or more management servers) that can receive data from computing device 110, and provide responses based on the content of the received data, in accordance with embodiments of the present invention. In other embodiments, data processing environment 100 can include additional instances of meters and computing devices (not shown) that can interface with server 120, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110 and server 120, in accordance with embodiments of the present invention. In various embodiments, network 105 facilitates communication among a plurality of networked computing devices (e.g., computing device 110, server 120, and other devices not shown), corresponding users (e.g., users of computing device 110 and server 120, etc.), and corresponding management services (e.g., server 120).

In various embodiments of the present invention, computing device 110 may be a workstation, personal computer, personal digital assistant, mobile phone, or any other device capable of executing computer readable program instructions, in accordance with embodiments of the present invention. In general, computing device 110 are representative of any electronic device or combination of electronic devices capable of executing computer readable program instructions. Computing device 110 may include components as depicted and described in further detail with respect to FIG. 6, in accordance with embodiments of the present invention. In an example embodiment, computing device 110 is a mobile device associated with (e.g., registered to) a user that interacts with meter 130 (e.g., captures a QR code), in accordance with embodiments of the present invention.

Computing device 110 includes user interface 112 and application 114. User interface 112 is a program that provides an interface between a user of computing device 110 and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In various example embodiments, application 114 can be an application that a user of computing device 110 utilizes to capture an image of meter 130, and transmit the captured image to server 120, in accordance with embodiments of the present invention. In other embodiments, application 114 can be another mobile device application (e.g., a web browser, enterprise-specific messaging application, social media application, QR reader, etc.). For example, application 114 is a client-side application associated with server 120 (e.g., a client-side application associated with measurement program 200), which includes camera capabilities and the capability to capture one or more QR codes of meter 130, in accordance with various embodiments of the present invention.

In an additional embodiment, application 114 can operate to perform processing steps of measurement program 200 (i.e., application 114 can be representative of measurement program 200 operating on computing device 110), in accordance with various embodiments of the present invention. For example, a user of computing device 110 can capture a QR code (e.g., on meter 130), analyze the captured QR code utilizing application 114 (and data stored on computing device 110), and view results of the analysis on computing device 110 (e.g., via user interface 112). In another embodiment, computing device 110 can be in intermittent communication with server 120. For example, computing device 110 can capture a QR code (e.g., while not connected to network 105) and then communicate data of the captured QR code to server 120 at a later time (e.g., when capable to connect to network 105).

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by elements of data processing environment 100 (e.g., computing device 110, other devices not shown). In general, server 120 is representative of any electronic device or combination of electronic devices capable of executing computer readable program instructions. Server 120 may include components as depicted and described in further detail with respect to FIG. 6, in accordance with embodiments of the present invention.

Server 120 includes measurement program 200 and storage device 122, which includes measurement data 124 and action data 126. In various embodiments of the present invention, server 120 operates as a computing system that hosts and/or manages an data associated with executing measurement program 200, with respect to data from a plurality of meters, such as meter 130. In an example embodiment, server 120 is associated with an enterprise or service provider (e.g., e-commerce platform, weather service, measurement database system, customer support platform, etc.) that interacts with users (e.g., user of computing device 110, or other users/devices not shown) that can send and/or request information.

In example embodiments, measurement program 200 determines information based on a received image, in accordance with embodiments of the present invention. For example, measurement program 200 receives image data (e.g., a captured QR code from computing device 110) and determines a measurement value corresponding to the image data. Further, measurement program 200 determines whether an action corresponds to the determined measurement value. In response to determining that the determined measurement value does correspond to an action, measurement program 200 can perform and/or facilitate execution of the identified action.

In additional embodiments, server 120 utilizes storage device 122 to store information associated measurement data of meter 130 (e.g., measurement data 124) and actions associated with determined measurements (e.g., action data 126). Storage device 122 can be implemented with any type of storage device, for example, persistent storage 605, which is capable of storing data that may be accessed and utilized by server 120 and computing device 110, such as a database server, a hard disk drive, or a flash memory. In other embodiments, storage device 122 can represent multiple storage devices and collections of data within server 120.

In additional embodiments, storage device 122 can also store other data relevant to various embodiments of the present invention. For example, storage device 122 can store historical measurement data associated with meter 130 (e.g., previously received images and corresponding measurements). In another example, storage device 122 can include user preference information (e.g., defined by a user of computing device 110). In a further example, storage device 122 can store various data associated with a meter (e.g., meter 130), such as a location (e.g., coordinates), maximum and minimum values of the meter, age of the meter, users associated with the meter, etc.

In various embodiments of the present invention, the user of computing device 110 can register with server 120 (e.g., via a corresponding application, such as application 114). For example, the user completes a registration process, provides information, and authorizes the collection and analysis (i.e., opts-in) of relevant data on at identified computing devices, (e.g., computing device 110), by server 120 (e.g., via measurement program 200, or other authorized applications). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In another embodiment, the user can define which forms of data that server 120 can utilize in executing aspects of measurement program 200.

In example embodiments, measurement data 124 is representative of an organized collection of information (e.g., a data set, a database, etc.) that includes data describing the relationship between image data and corresponding measurement data, in accordance with embodiments of the present invention. For example, measurement data 124 stores a mapped relationship of a QR code to a corresponding temperature (e.g., a corresponding data entry). Various examples for mapping QR codes to corresponding measurement values are discussed in further detail with regard to FIG. 3, FIGS. 4A-4E, and FIGS. 5A-5E.

In another embodiment, action data 126 includes actions and or processes that server 120 can request and/or initiate in response to determining a corresponding measurement value. In example embodiments, action data 126 is representative of an organized collection of information (e.g., a data set, a database, etc.) that includes data describing the relationship between a determined measurement and a corresponding action/process. For example, in response to reading/determining measurement data, measurement program 200 can operate to initiate one or more business processes, such through integration with an enterprise resource planning (ERP), enterprise asset management (EAM), building information modeling (BIM), etc., application(s). In an example scenario where the measurement data is temperature data, action data 126 includes data indicating which actions/processes to initiate in response to particular temperature readings. In various embodiments, the actions in action data 126 can include, but are not limited to, initiation of a proactive action (e.g., terminate a process/application, shut down a computer, turn on/off air conditioner, turn on/off heat, etc.), sending an alert to one or more users, recording the determined measurement/value, etc.

In various embodiments, meter 130 is measurement device, in accordance with various embodiments of the present invention. In an example aspect, meter 130 comprises a label comprising different QR codes. The label comprises a fixed background pattern with printed QR codes, which is overlaid by a foreground transparent sliding mask with the same shifted printed QR codes. The relative position of the sliding mask on the fixed pattern is governed by the lengthwise variation associated to the measured data. For example, the dilatation of a rod hooked on the sliding mask can modify the relative position of the sliding mask on the fixed pattern. In other aspects, the rod can be any movable device that can move/slide corresponding to observer measurement data. The positioning of the QR codes both on the fixed pattern and on the sliding mask is such that the pattern/mask superposition exhibits a single valid QR code for a given translation associated to a given value of the measured data. By encoding the corresponding value, completed by the fixed data, the valid QR code delivers a self-contained record comprising accurate live information from meter 130. In example embodiments, the label of meter 130 can operate as a passive outdoor environmental monitor. In alternate aspects (depicted in the Figures and described in further detail later), the QR codes can be arranged in a row either parallel or orthogonal to the translation direction. In other embodiments, a meter can include QR codes in any possible different arrangement, such as on a rotational axis, etc.

Figure 3:
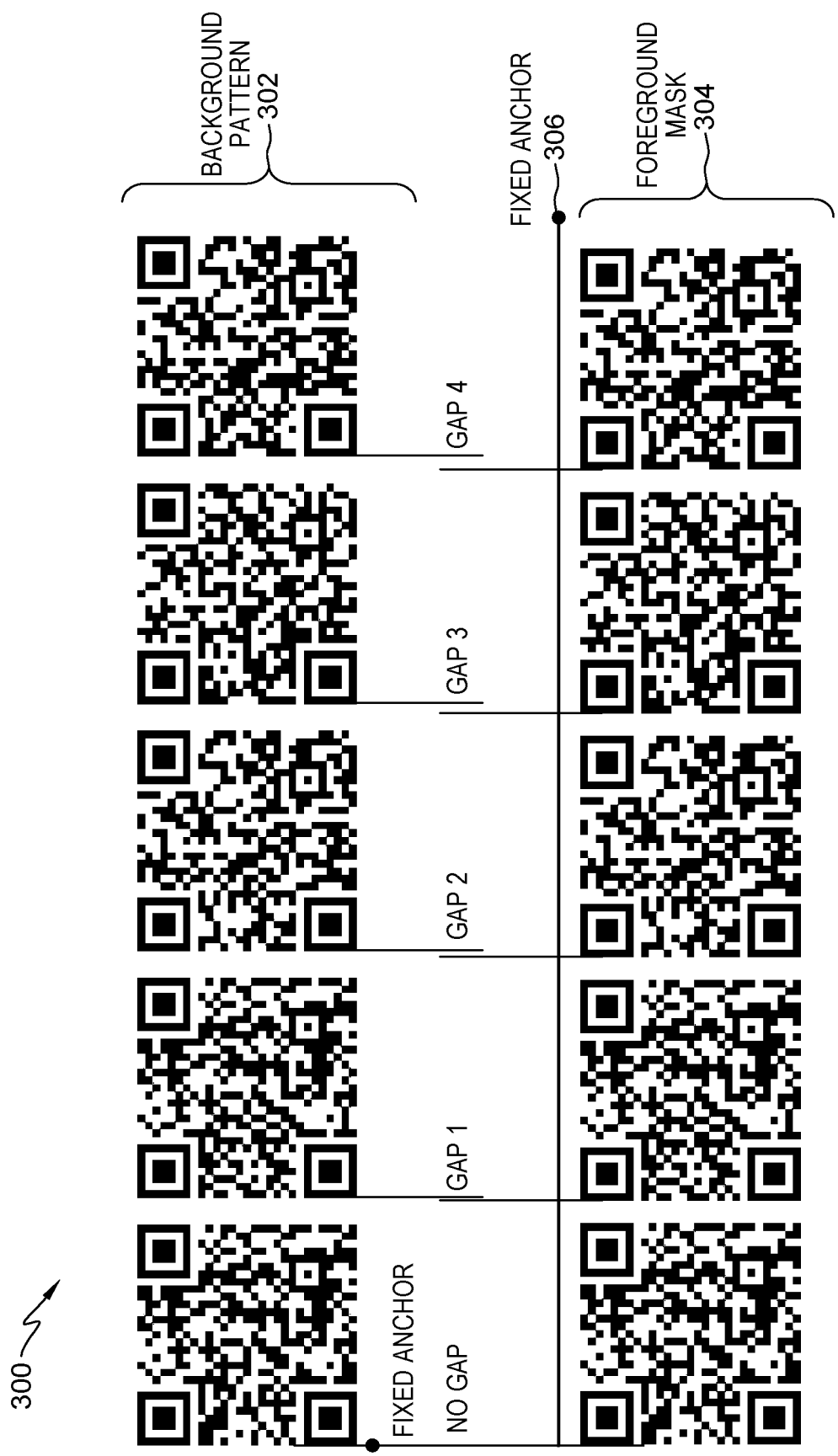
FIG. 3 depicts an example set of quick response (QR) codes for a measurement device, in accordance with embodiments of the present invention.

In various embodiments, meter 130 can operate to provide lengthwise variation in response to changing of a measured parameter (e.g., temperature or other environmental parameters). In example embodiments, meter 130 is comprised of QR codes 300, depicted in FIG. 3. FIG. 3 depicts background pattern 302, foreground mask 304, and fixed anchor 306. With reference to the depicted example of FIG. 3, meter 130 includes foreground mask 304 overlaying background pattern 302. Foreground mask 304 can be linked with the free end of a rod with the other end being linked to fixed anchor 306. In an example, when temperature varies, the rod length varies, hence sliding foreground mask 304 over background pattern 302. In this example, the rod is a rod with a high dilation coefficient. In the depicted example of FIG. 3, the respective QR codes are arranged utilizing corresponding spacing between QR codes of no gap, gap 1, gap 2, gap 3, and gap 4. The specific spacing and orientation of the gaps allows for QR codes of foreground mask 304 to overlay background pattern 302, when meter 130 measures the corresponding temperature.

Figure 4A:
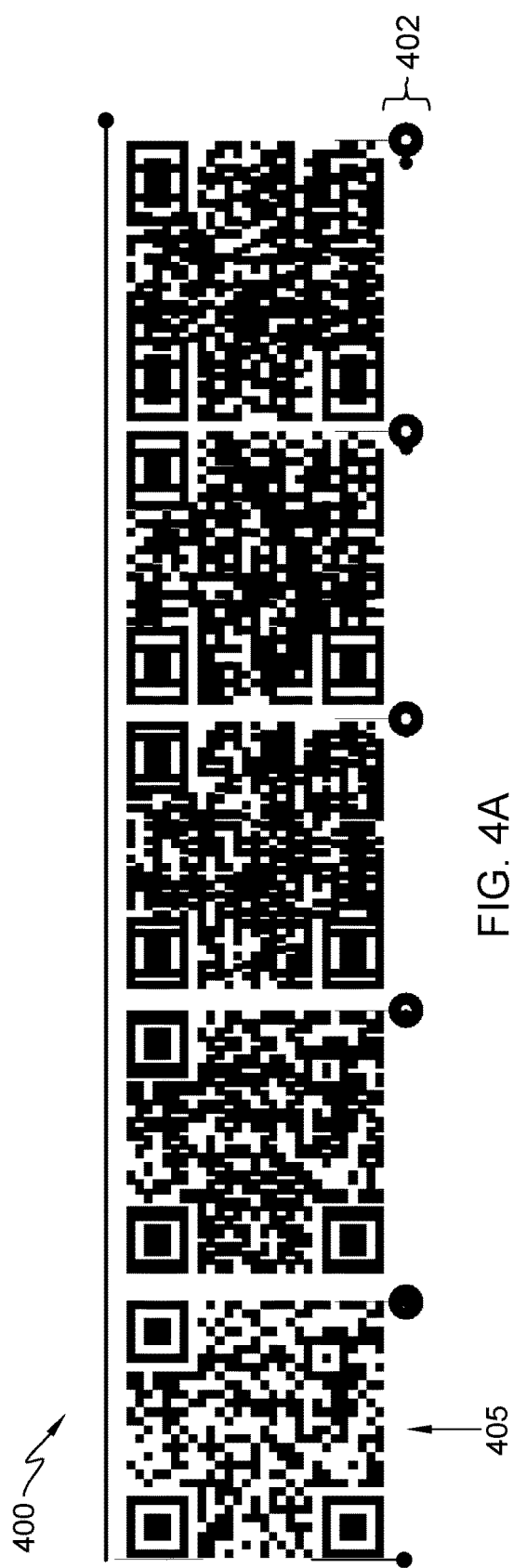
FIG. 4A depicts a visual representation of an example meter, when at a temperature that corresponds to measurement using QR code overlay of a foreground mask on a background pattern arranged parallel to the translation, in accordance with various embodiments of the present invention.

In a further aspect, FIGS. 4A, 4B, 4C, 4D, and 4E each respectively depict a visual representation of meter 130, when at a temperature that corresponds to measurement using QR code overlay of foreground mask 304 on background pattern 302 arranged parallel to the translation (i.e., capable of horizontal movement), in accordance with various embodiments of the present invention. For example, FIG. 4A depicts meter orientation 400, which includes QR code 405 (i.e., a superposition/match of the left-most QR codes in the depiction). In this example, computing device 110 can capture an image of meter 130, which includes QR code 405. Accordingly, through processing, measurement program 200 (described in further detail with regard to FIG. 2) can determine that meter 130 is measuring a temperature of 20 degrees Celsius. In another aspect, meter 130 can optionally include a collimator, depicted in FIG. 4A as collimator row 402, for an additional factor in determining and/or monitoring alignment of the QR codes of meter 130.

In another embodiment, FIGS. 5A, 5B, 5C, 5D, and 5E each respectively depict a visual representation of meter 130, when at a temperature that corresponds to measurement using QR code overlay of foreground mask 304 on background pattern 302 arranged orthogonal to the translation (i.e., capable of vertical movement), in accordance with various embodiments of the present invention. In other embodiments, meter 130 (or another meter) can include QR codes in any possible different arrangement, such as on a rotational axis, etc. In another aspect, meter 130 can optionally include a collimator (e.g., similar to collimator row 402 of FIG. 4A), for an additional factor in determining and/or monitoring alignment of the QR codes of meter 130.

In an additional embodiment, meter 130 can be combined with computing device 110, to facilitate an instance of meter 130 that can communicate via network 105 (e.g., an Internet of Things (IoT) device). For example, computing device 110 can be operatively coupled to meter 130, and also be capable of capturing images of meter 130. In an example scenario, computing device 110 can automatically track (e.g., capture images at defined intervals) measurements of meter 130, for transmission to server 120, in accordance with embodiments of the present invention.

Various embodiments of the present invention can deploy a meter, based on the QR code overlay implementation of meter 130, for a variety of use cases. Examples of use cases include, but are not limited to hydrology (e.g., water reservoir level, flow meter, turbidity meter, etc.), weather technology for a grid (e.g., temperature, wind speed, wind direction, air pressure, humidity, etc.), construction (e.g., crack gauge, shear gauge, etc.), vegetation management (e.g., tree height meter, trunk meter, etc.), sport (e.g., temperature, wing speed, wind direction, air pressure, etc.), etc.

Figure 2:
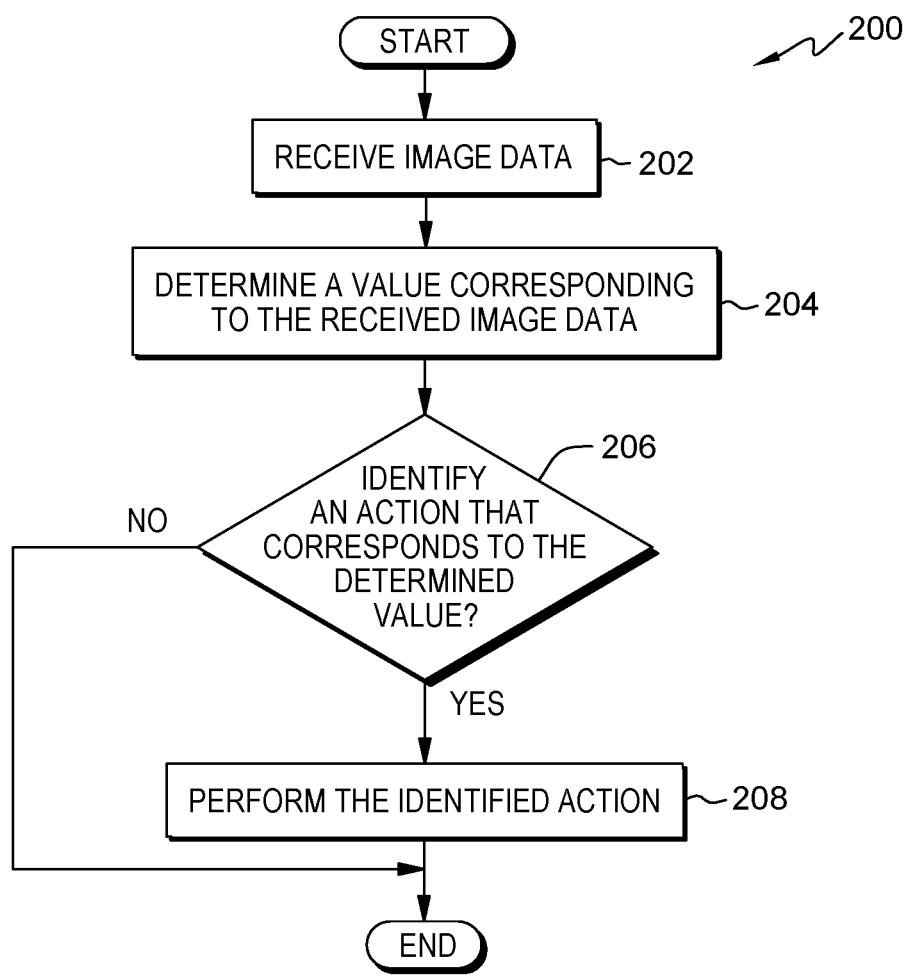
FIG. 2 is a flowchart depicting operational steps of a program for determining information based on a received image, in accordance with embodiments of the present invention.

FIG. 2 is a flowchart depicting operational steps of measurement program 200, a program for determining information based on a received image, in accordance with embodiments of the present invention. In one embodiment, measurement program 200 initiates in response to receiving a request and/or receiving data from a computing device (e.g., computing device 110). For example, measurement program 200 initiates in response to receiving a request to analyze a QR code. In another embodiment, measurement program 200 can operate as a background process on server 120, waiting to receive data (e.g., images, QR code readings, etc.).

In step 202, measurement program 200 receives image data. In one embodiment, measurement program 200 receives image data, which includes one or more QR codes from meter 130, from computing device 110. Measurement program 200 can receive an image, or any other form of incoming data that can include information or objects represented in measurement data 124, in accordance with various embodiments of the present invention. In one example, measurement program 200 receives an image of a QR code from computing device 110. In another example, measurement program 200 receives data from a QR code reader app of computing device 110. In this example, computing device 110 can capture a QR code of meter 130, parse the QR code utilizing a QR reader application (e.g., application 114) to determine data corresponding to the captured QR code of the meter. Then, computing device 110 can send the determined data parsed from the QR code to server 120, for receipt and processing by measurement program 200.

Figure 4B:
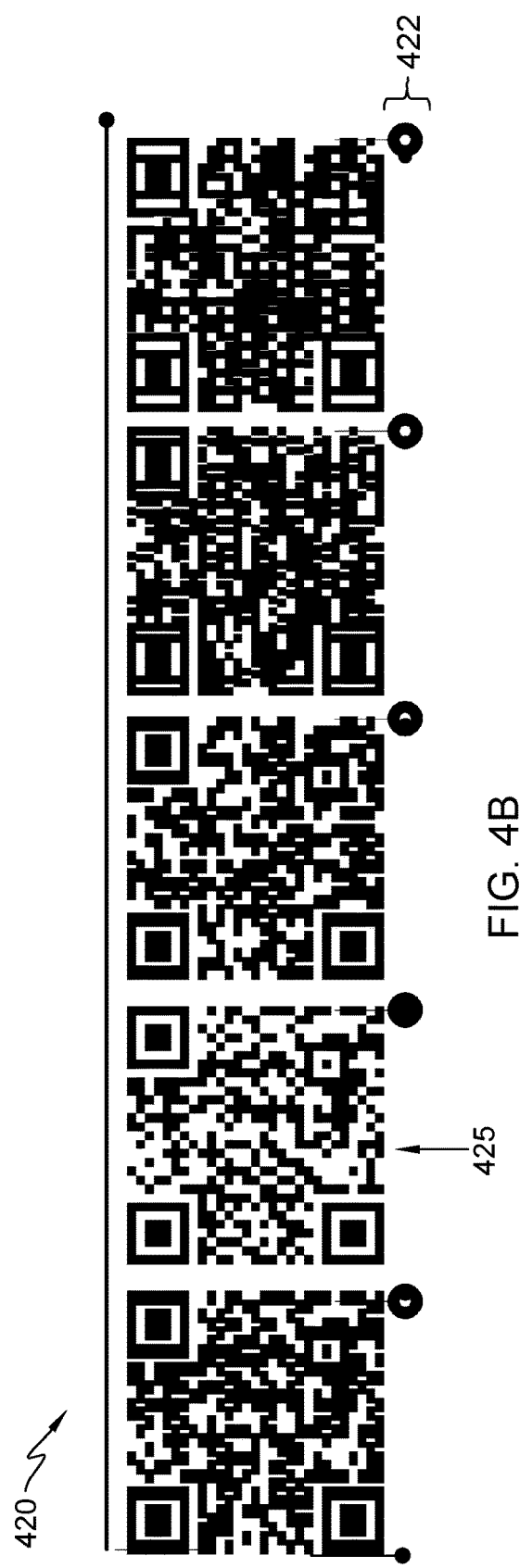
FIG. 4B depicts a visual representation of an example meter, when at a temperature that corresponds to measurement using QR code overlay of a foreground mask on a background pattern arranged parallel to the translation, in accordance with various embodiments of the present invention.

In an example scenario, computing device 110 captures an image of meter 130 (e.g., a thermometer) that corresponds to meter orientation 420 (depicted in FIG. 4B). In this example scenario, foreground mask 304 overlays background pattern 302 to depict QR code 425 (i.e., the image of meter 130 includes a single QR code (QR code 425) that has clearly defined sharp pixel definition). For example, QR code 425 corresponds to a superposition of foreground mask 304 overlaying background pattern 302, which depicts QR code 425 as a valid QR code. Computing device 110 can then send the image of meter orientation 420, including QR code 425, to measurement program 200. In various embodiments, measurement program 200 can parse the received image data to identify one or more features of the image data. In this example scenario, measurement program 200 parses the image data received from computing device 110 and identifies QR code 425 (i.e., the QR code that is a clear image of a QR code of foreground mask 304 properly overlaying background pattern 302).

In alternative example scenarios, measurement program 200 can receive image data that includes content from meter orientation 400, meter orientation 420, meter orientation 440, meter orientation 460, meter orientation 480, meter orientation 500, meter orientation 520, meter orientation 540, meter orientation 560, and meter orientation 580 (i.e., FIGS. 4A-4E and FIGS. 5A-5E), in accordance with various embodiments of the present invention. In an additional embodiment, measurement program 200 can utilize the collimator row of meter 130 (e.g., collimator row 422 of FIG. 4B) as an additional factor in identifying the correct QR code from a plurality of QR codes in received image data. In other embodiments, measurement program 200 can receive images that include one or more identifiable objects, which messaging program 200 can identify and utilize in accordance with various embodiments of the present invention.

In another embodiment, computing device 110 can be in intermittent communication with server 120. For example, computing device 110 can capture a QR code (e.g., while not connected to network 105) and then communicate data of the captured QR code to server 120 at a later time (e.g., when capable to connect to network 105).

In step 204, measurement program 200 determines a value corresponding to the received image data. In one embodiment, measurement program 200 compares content (e.g., an identified QR code) of the received image (from step 202) to information in measurement data 124. In example embodiments, measurement data 124 is representative of an organized collection of information (e.g., a data set, a database, etc.) that includes data describing the relationship between image data and corresponding measurement data, in accordance with embodiments of the present invention. For example, measurement data 124 stores a mapped relationship of a QR code to a corresponding temperature. In various embodiments, measurement program 200 references the received image data to measurement data 124, to determine the encoded data that corresponds to the reading depicted in the received image data (e.g., the QR code).

In example embodiments, each QR code of meter 130 is included in measurement data 124 and corresponds to a particular data point, such as a corresponding temperature. For example, with regard to FIGS. 4A-4E, QR code 405 corresponds to a temperature of 20 degrees Celsius, QR code 425 corresponds to a temperature of 21 degrees Celsius, QR code 445 corresponds to a temperature of 22 degrees Celsius, QR code 465 corresponds to a temperature of 23 degrees Celsius, and QR code 485 corresponds to a temperature of 24 degrees Celsius. In another example, with regard to FIGS. 5A-5E, QR code 505 corresponds to a temperature of 20 degrees Celsius, QR code 525 corresponds to a temperature of 21 degrees Celsius, QR code 545 corresponds to a temperature of 22 degrees Celsius, QR code 565 corresponds to a temperature of 23 degrees Celsius, and QR code 585 corresponds to a temperature of 24 degrees Celsius.

In another aspect, depending on the measured parameter and associated mechanical set-up, the lengthwise variation can be proportional or not to the measured parameter. Embodiments of the present invention allow for directly mapping the lengthwise variation of a meter (e.g., meter 130) to directly map to a measured parameter through a linear function, or indirectly through a conversion table (e.g., in measurement data 124), where the lengthwise variation in an index in the conversion table. Accordingly, embodiments of the present invention allow for recalibration by updating the conversion table based on incoming data from a mobile device (e.g., computing device 110).

In the previously discussed example scenario, computing device 110 sent an image of meter 130, including meter orientation 420 and QR code 425, to server 120 (and messaging program 200). In this example scenario, measurement program 200 parsed the received image data to identify QR code 425. Measurement program 200 can then compare QR code 425 to measurement data 124, to determine a temperature value that corresponds to QR code 425. In this example scenario, measurement program 200 determines a temperature value of 21 degrees Celsius.

In another embodiment, measurement program 200 can identify additional information that is associated with received image data. In example embodiments, measurement program 200 can determine a location associated with the content of the received image data, based on analyzing the content of the image data. For example, measurement program 200 can identify that the received image data corresponds to meter 130 (e.g., based on information included with the image data from computing device 110, based on identifying a specific characteristic in the image data, such as a QR code, or other identifiable factors). In this example, measurement program 200 can determine location coordinates that correspond to the received image data (and meter 130).

In decision step 206, measurement program 200 determines whether an action corresponds to the determined value. In one embodiment, measurement program 200 determines whether the received image data (from step 202) and/or the determined value (from step 204) corresponds to data in action data 126. In an additional embodiment, measurement program 200 also searches for an action in action data 126 that corresponds to meter 130 (i.e., the source/location of the image data). In various embodiments, action data 126 includes actions and or processes that server 120 can request and/or initiate in response to determining a corresponding measurement value. In example embodiments, action data 126 is representative of an organized collection of information (e.g., a data set, a database, etc.) that includes data describing the relationship between a determined measurement and a corresponding action/process.

In another embodiment, measurement program 200 determines whether a match exists between content of action data 126 and one or more of content of the received image data (e.g., received QR code in step 202) and the determined value that corresponds to the received image data (e.g., the value from measurement data 124 determined in step 204). In response to determining that an action does not correspond to the determined value (decision step 206, NO branch), measurement program 200 ends. In an optional embodiment, in response to determining that an action does not correspond to the determined value (decision step 206, NO branch), measurement program 200 can record or track one or more of content of the received image data (e.g., received QR code in step 202) and the determined value that corresponds to the received image data (e.g., the value from measurement data 124 determined in step 204) in storage device 122.

In the previously discussed example scenario, measurement program 200 compare QR code 425 to measurement data 124, to determine a temperature value of 21 degrees Celsius. In this example, measurement program 200 can search action data 126 for actions that corresponds to one or more of QR code 425 and 21 degrees Celsius. Further, measurement program 200 searches for the actions that correspond to meter 130, or a location associated with meter 130, for actions that correspond to the source of the image data. In this example scenario, measurement program 200 determines that action data 126 includes an indication of QR code 425, and that action data 126 indicates to modify a temperature of a heating, ventilation, and air conditioning (HVAC) system in a location that corresponds to meter 130.

In another example, measurement program 200 can determine that action data 126 includes an action (corresponding to the determined value of step 204) to power on one or more computing systems at a location associated with meter 130. In an additional example scenario, measurement program 200 can determine that action data 126 includes an action (corresponding to the determined value of step 204) to send an alert to one or more users. In this example scenario, one or more users have registered (e.g., provided user preference data to server 120) to receive alerts when the temperature at the location of meter 130 reaches a certain temperature. Accordingly, action data 126 can include the indication to send the alert to the one or more users, in response to measurement program 200 determining the corresponding temperature reading of meter 130.

In step 208, measurement program 200 performs the identified action. More specifically, in response to determining that an action does correspond to the determined value (decision step 206, YES branch), measurement program 200 performs the action. In one embodiment, measurement program 200 performs an action identified in action data 126 (from decision step 206). In various embodiments, the actions in action data 126 can include, but are not limited to, initiation of a proactive action (e.g., terminate a process/application, shut down a computer, turn on/off air conditioner, turn on/off heat, etc.), sending an alert to one or more users, recording the determined measurement/value, etc.

In the previously discussed example scenario, measurement program 200 determines (in decision step 206) that action data 126 includes an indication of QR code 425, and that action data 126 indicates to modify a temperature of a HVAC system in a location that corresponds to meter 130. Accordingly, measurement program 200 sends an instruction (via network 105) to modify the temperature of the HVAC system in the location corresponding to meter 130.

In another example, measurement program 200 can send an alert to one or more users (based on user preference data in storage device 122), in response to measurement program 200 determining a particular temperature reading of meter 130. In other embodiments, measurement program 200 can proactively perform actions and/or send instructions (over network 105) to execute any other actions identified in action data 126, in accordance with various embodiments of the present invention.

FIG. 3 depicts QR codes 300, which includes depicts background pattern 302, foreground mask 304, and fixed anchor 306, in accordance with various embodiments of the present invention. In example embodiments, meter 130 is comprised of QR codes 300, depicted in FIG. 3. With reference to the depicted example of FIG. 3, meter 130 includes foreground mask 304 overlaying background pattern 302. Foreground mask 304 can be linked with the free end of a rod with the other end being linked to fixed anchor 306. In an example, when temperature varies, the rod length varies, hence sliding foreground mask 304 over background pattern 302. In this example, the rod is a rod with a high dilation coefficient. In the depicted example of FIG. 3, the respective QR codes are arranged utilizing corresponding spacing between QR codes of no gap, gap 1, gap 2, gap 3, and gap 4. The specific spacing and orientation of the gaps allows for QR codes of foreground mask 304 to overlay background pattern 302, when meter 130 measures the corresponding temperature.

Figure 4C:
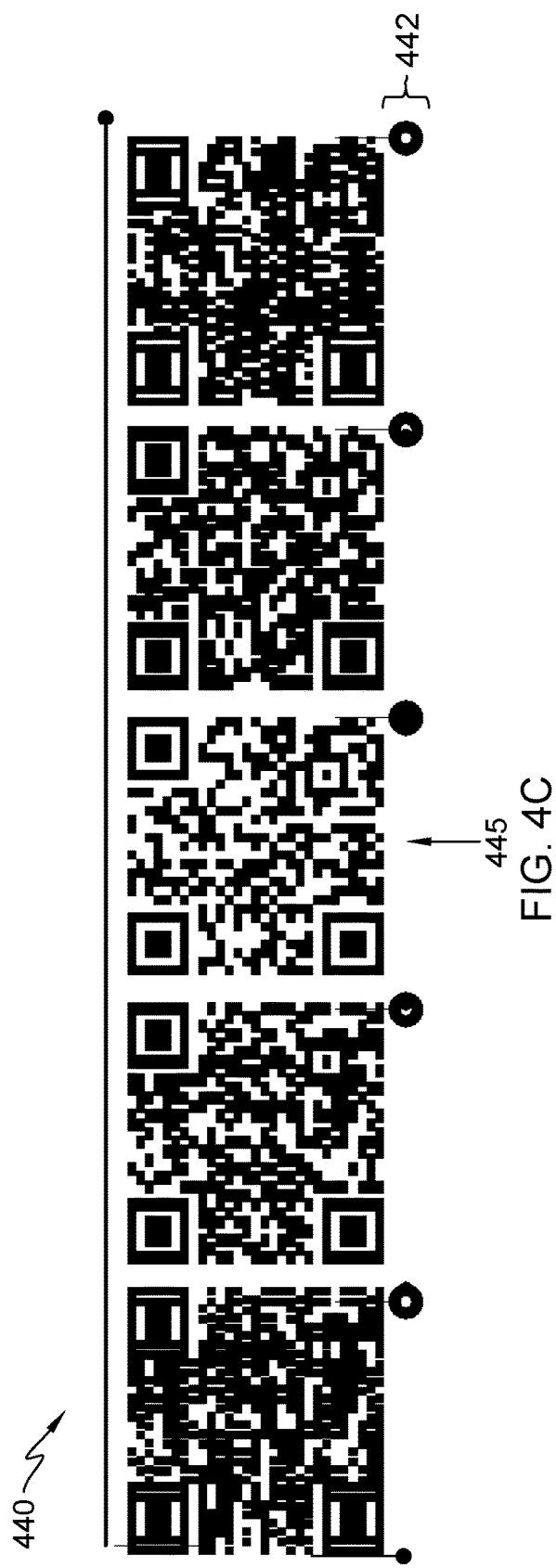
FIG. 4C depicts a visual representation of an example meter, when at a temperature that corresponds to measurement using QR code overlay of a foreground mask on a background pattern arranged parallel to the translation, in accordance with various embodiments of the present invention.
Figure 4D:
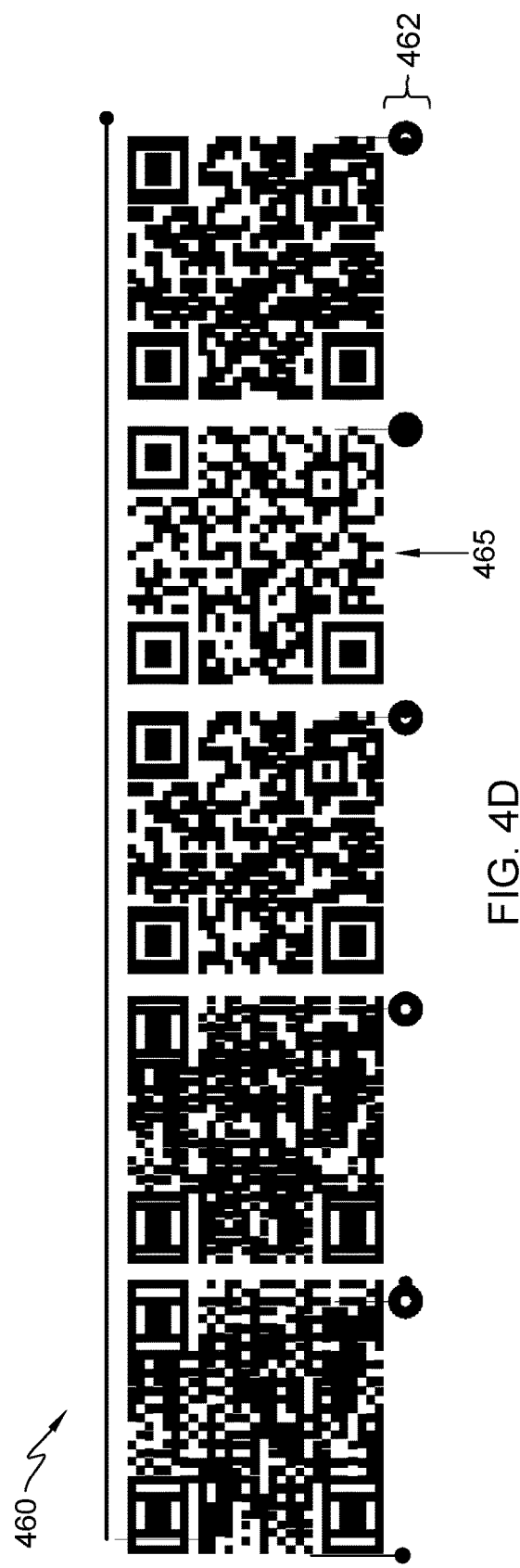
FIG. 4D depicts a visual representation of an example meter, when at a temperature that corresponds to measurement using QR code overlay of a foreground mask on a background pattern arranged parallel to the translation, in accordance with various embodiments of the present invention.
Figure 4E:
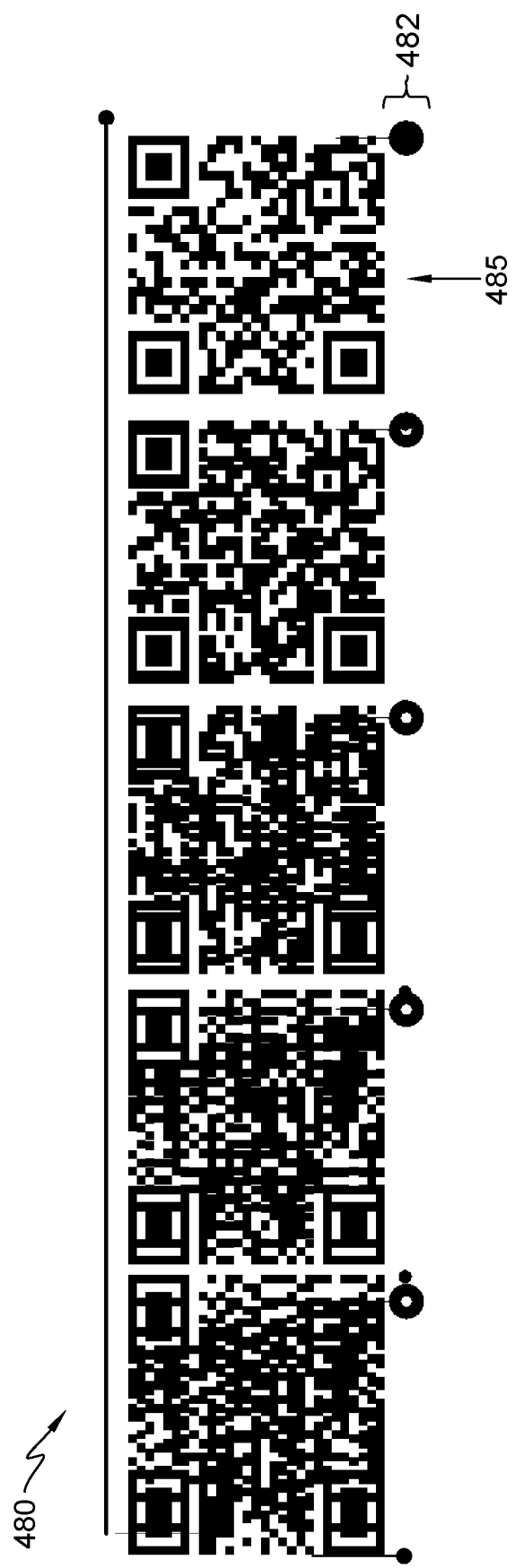
FIG. 4E depicts a visual representation of an example meter, when at a temperature that corresponds to measurement using QR code overlay of a foreground mask on a background pattern arranged parallel to the translation, in accordance with various embodiments of the present invention.

FIGS. 4A, 4B, 4C, 4D, and 4E each respectively depict a visual representation of meter 130, when at a temperature that corresponds to measurement using QR code overlay of foreground mask 304 on background pattern 302 arranged parallel to the translation (i.e., capable of horizontal movement), in accordance with various embodiments of the present invention. FIG. 4A depicts meter orientation 400, which includes QR code 405 (i.e., a superposition/match of the left-most QR codes in the depiction) and collimator row 402, in an example embodiment of the present invention. FIG. 4B depicts meter orientation 420, which includes QR code 425 and collimator row 422, in an example embodiment of the present invention. FIG. 4C depicts meter orientation 440, which includes QR code 445 and collimator row 442, in an example embodiment of the present invention. FIG. 4D depicts meter orientation 460, which includes QR code 465 and collimator row 462, in an example embodiment of the present invention. FIG. 4E depicts meter orientation 480, which includes QR code 485 and collimator row 482, in an example embodiment of the present invention.

Figure 5E:
FIG. 5E depicts a visual representation of an example meter, when at a temperature that corresponds to measurement using QR code overlay of a foreground mask on a background pattern arranged orthogonal to the translation, in accordance with various embodiments of the present invention.

FIGS. 5A, 5B, 5C, 5D, and 5E each respectively depict a visual representation of meter 130, when at a temperature that corresponds to measurement using QR code overlay of foreground mask 304 on background pattern 302 arranged orthogonal to the translation (i.e., capable of vertical movement), in accordance with various embodiments of the present invention. FIG. 5A depicts meter orientation 500, which includes QR code 505 (i.e., a superposition/match of the left-most QR codes in the depiction), in an example embodiment of the present invention. FIG. 5B depicts meter orientation 520, which includes QR code 525, in an example embodiment of the present invention. FIG. 5C depicts meter orientation 540, which includes QR code 545, in an example embodiment of the present invention. FIG. 5D depicts meter orientation 560, which includes QR code 565, in an example embodiment of the present invention. FIG. 5E depicts meter orientation 580, which includes QR code 585, in an example embodiment of the present invention. In another aspect, meter 130 can optionally include a collimator (e.g., similar to collimator row 402 of FIG. 4A), for an additional factor in determining and/or monitoring alignment of the QR codes of meter 130.

Figure 6:
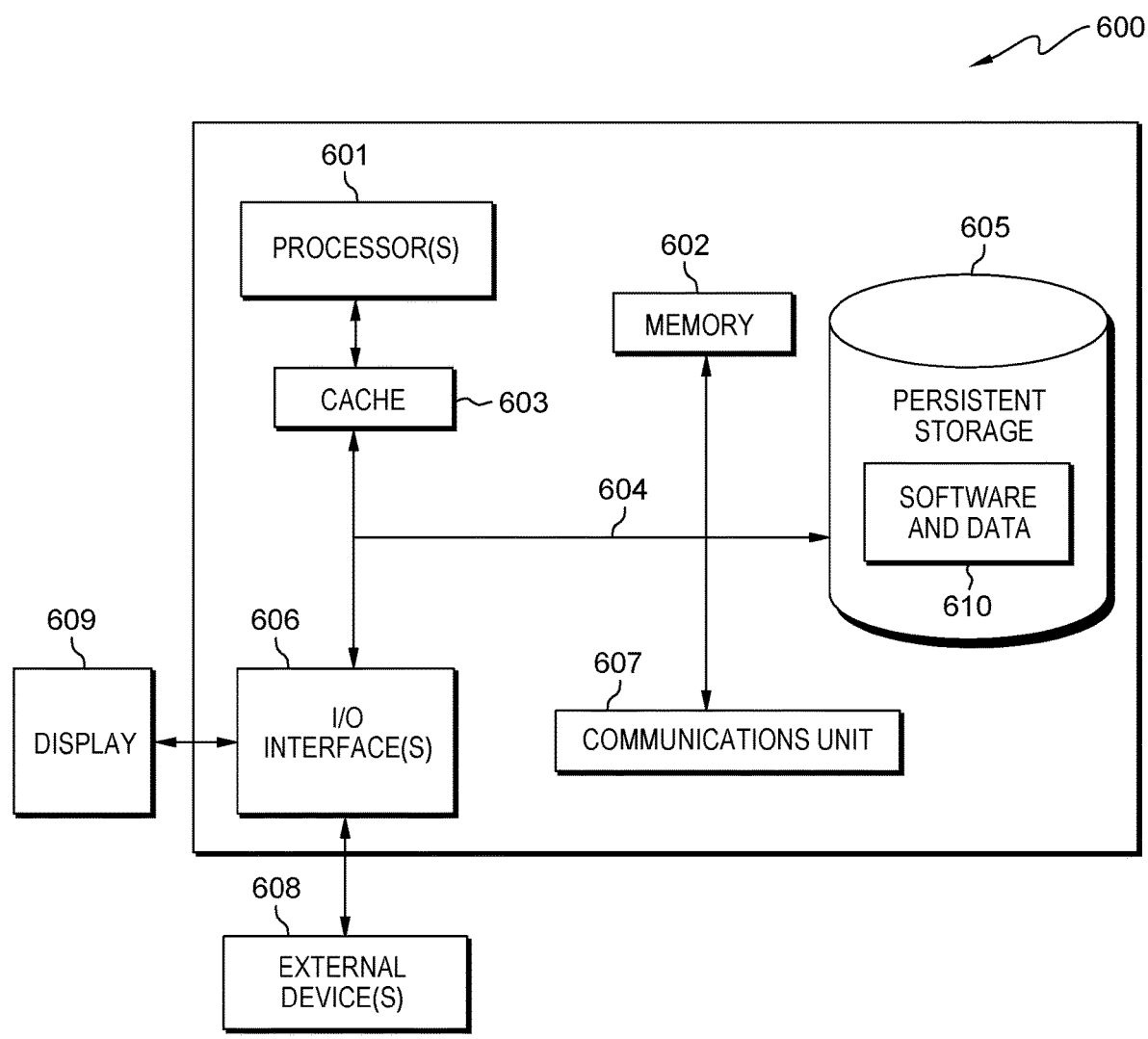
FIG. 6 depicts a block diagram of components of a computing system representative of the computing device and server of FIG. 1, in accordance with an embodiment of the present invention.

FIG. 6 depicts computer system 600, which is representative of computing device 110 and server 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data 610) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 610 can be stored in persistent storage 605 for access and/or execution by one or more of the respective processor(s) 601 via cache 603. With respect to computing device 110, software and data 610 includes user interface 112 and application 114. With respect to server 12, software and data 610 includes measurement program 200, storage device 122, measurement data 124, and action data 126.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., software and data 610) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., software and data 610) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, image data from a computing device;
   identifying, by one or more processors, an object included in the received image data;
   determining, by one or more processors, a value that corresponds to the identified object included in the received image data;
   determining, by one or more processors, whether the determined value corresponds to a defined action;
   the identified object including a machine-readable printed code, the identified object being part of a label, and the label including a fixed background pattern with a printed code;
   overlaying the label with a foreground transparent sliding mask with a shifted printed code, wherein the relative position of the sliding mask on the fixed pattern is governed by a lengthwise variation associated with measured data; and
   positioning of the fixed pattern of the printed code and the sliding mask resulting in a pattern/mask superposition exhibiting a single valid code for the value associated to the measured data.

2. The method of claim 1, further comprising:
   in response to determining that the determined value does correspond to a defined action, executing, by one or more processors, the defined action.

3. The method of claim 1, wherein the identified object is a quick response (QR) code.

4. The method of claim 1, wherein the identified object is a first image overlaying a second image in a superposition.

5. The method of claim 1, wherein the identified object is a first QR code overlaying a second QR code in a superposition.

6. The method of claim 1, wherein the received image data from the computing device includes encoded data from a QR code reader application.

7. The method of claim 1, wherein determining a value that corresponds to the identified object included in the received image data further comprises:
   determining, by one or more processors, a mapped relationship between the identified object and a corresponding data entry.

8. The method of claim 1, wherein determining whether the determined value corresponds to a defined action further comprises:
   searching, by one or more processors, a database for an executable action that corresponds to a location of a source associated with the received image data and the determined value.

9. The method of claim 3, wherein determining a value that corresponds to the identified object included in the received image data further comprises:
   determining, by one or more processors, an environmental parameter that corresponds to the identified object included in the received image data.

10. A computer system comprising:
    one or more computer processors;
    one or more computer readable storage media; and
    program instructions stored on the computer readable storage media for execution by at least one of the one or more processors, the program instructions comprising:
    program instructions to receive image data from a computing device;
    program instructions to identify an object included in the received image data;
    program instructions to determine a value that corresponds to the identified object included in the received image data;
    program instructions to determine whether the determined value corresponds to a defined action;
    the identified object including a machine-readable printed code, the identified object being part of a label, and the label including a fixed background pattern with a printed code;
    program instructions to overlay the label with a foreground transparent sliding mask with a shifted printed code, wherein the relative position of the sliding mask on the fixed pattern is governed by a lengthwise variation associated with measured data; and
    program instructions to position the fixed pattern of the printed code and the sliding mask resulting in a pattern/mask superposition exhibiting a single valid code for the value associated to the measured data.

11. The computer system of claim 10, further comprising program instructions, stored on the computer readable storage media for execution by at least one of the one or more processors, to:
    in response to determining that the determined value does correspond to a defined action, execute the defined action.

12. The computer system of claim 10, wherein the identified object is a first image overlaying a second image in a superposition.

13. The computer system of claim 10, wherein the identified object is a first QR code overlaying a second QR code in a superposition.

14. The computer system of claim 10, wherein the received image data from the computing device includes encoded data from a QR code reader application.

15. The computer system of claim 10, wherein the program instructions to determine a value that corresponds to the identified object included in the received image data further comprise program instructions to:
    determine a mapped relationship between the identified object and a corresponding data entry.

16. The computer system of claim 10, wherein the program instructions to determine whether the determined value corresponds to a defined action further comprise program instructions to:
    search a database for an executable action that corresponds to a location of a source associated with the received image data and the determined value.

17. An apparatus comprising:
    a background label, the background label depicting a first set of objects, wherein the background label is anchored to a fixed position;
    a foreground label overlaying the background label, the foreground label depicting a second set of objects, wherein the second set of objects matches the first set of objects, and wherein spacing between respective objects of the second set of objects is shifted relative to spacing between respective objects of the first set of objects, corresponding to defined measurement values associated with the foreground label and the background label; and a measurement device coupled to the foreground label, the measurement device being moveable in a first direction corresponding to observed measurement data, such that positioning of the measurement device results in a pattern/mask superposition exhibiting a single valid code for a value associated to the observed measured data.

18. The apparatus of claim 17, wherein the first set of objects and the second set of objects are quick response (QR) codes.

19. The apparatus of claim 17, wherein the spacing between respective objects of the second set of objects and the first set of objects is such that the foreground label overlays the background label to depict a superposition of a first object of the first set of objects and a first object of the second set of objects, corresponding to measuring a first defined measurement value.

20. The apparatus of claim 19, wherein the spacing between respective objects of the second set of objects and the first set of objects is such that the foreground label overlays the background label to depict a superposition of a second object of the first set of objects and a second object of the second set of objects, corresponding to measuring a second defined measurement value.

* * * * *